T. A. GANNOE.
TROLLEY HARP.
APPLICATION FILED APR. 1, 1908.
931,592.
Patented Aug. 17, 1909.
2 SHEETS—SHEET 1.
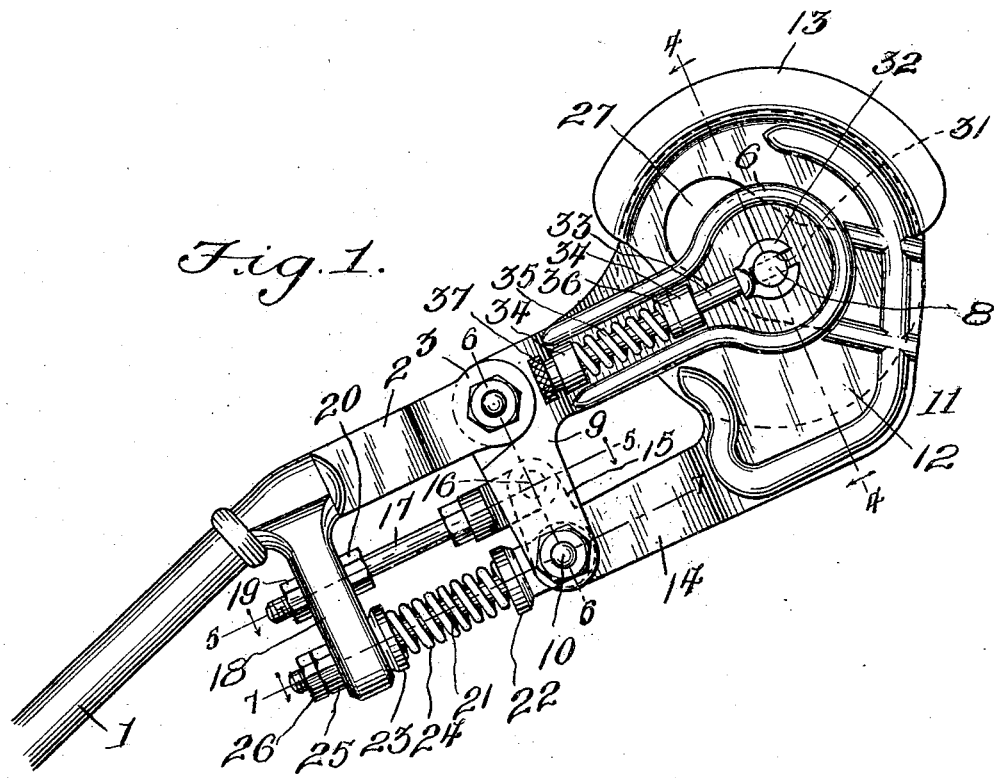
Witnesses
Inventor
Thomas A. Gannoe,
By Victor J. Evans,
Attorney T. A. GANNOE.
TROLLEY HARP.
APPLICATION FILED APR. 1, 1908.
931,592.
Patented Aug. 17, 1909.
2 SHEETS—SHEET 2.
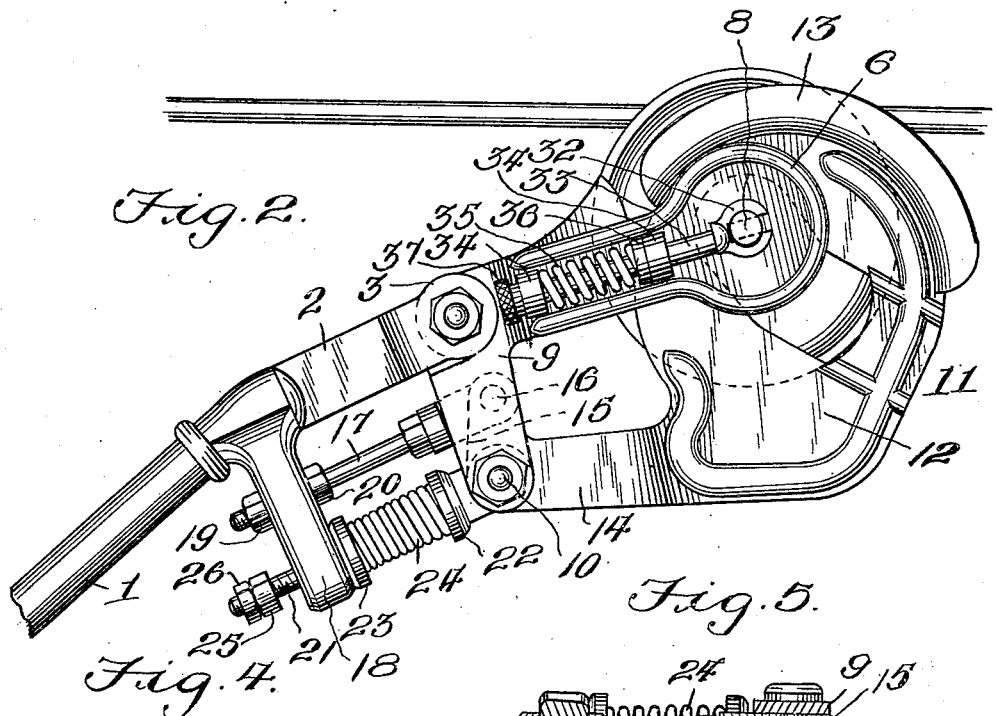
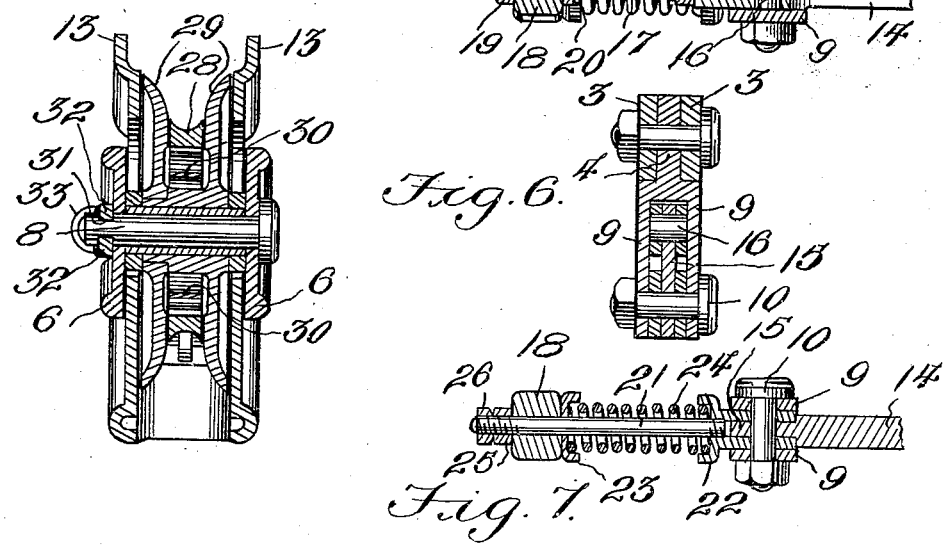
Witnesses
J. T. L. Wright,
R. M. Smith.
Inventor
Thomas A. Gannoe.
By Victor J. Evans,
Attorney

UNITED STATES PATENT OFFICE.

THOMAS A. GANNOE, OF WARREN, PENNSYLVANIA, ASSIGNOR OF THREE-EIGHTHS TO JOHN SCHMUTZ, OF WARREN, PENNSYLVANIA.

TROLLEY-HARP.

No. 931,592.     Specification of Letters Patent.     Patented Aug. 17, 1909.

Application filed April 1, 1908. Serial No. 424,597.

*To all whom it may concern:*

Be it known that I, THOMAS A. GANNOE, a citizen of the United States, residing at Warren, in the county of Warren and State of Pennsylvania, have invented new and useful Improvements in Trolley-Harps, of which the following is a specification.

This invention relates to trolley harps, and the object of the same is to provide in combination with a trolley wheel a harp and guard for preventing the wheel from jumping off the overhead wire or conductor and means controlled by the pressure between said wheel and the overhead wire operating to hold the guard out of working position.

A further object of the invention is to provide means for moving the guard into operative position when the pressure between the trolley wheel and the overhead wire is relieved.

With the above and other objects in view, the invention consists in the novel construction, combination and arrangement of parts as herein fully described, illustrated and claimed.

In the accompanying drawing:—Figure 1 is a side elevation of the trolley harp showing the position the parts assume when pressure between the wheel and overhead wire is relieved. Fig. 2 is a similar view showing the normal position of the parts when the wheel is pressed against the wire. Fig. 3 is a top plan view of the same. Fig. 4 is a diametrical section of the trolley wheel on the line 4—4 of Fig. 1. Fig. 5 is a detail section on the line 5—5 of Fig. 1. Fig. 6 is a detail cross section on the line 6—6 of Fig. 1. Fig. 7 is a detail longitudinal section on the line 7—7 of Fig. 1.

In the drawing, 1 designates the trolley harp and 2 the trolley arm extending therefrom which in the preferred embodiment of this invention is bifurcated as shown at 3 to receive the pivot lug 4 of the fork or carrier 5 between the branches 6 on which the trolley wheel 7 is journaled.

The trolley wheel fork or carrier 5 is of elbow or bell crank form as best shown in Figs. 1 and 2, the longer arm of the lever consisting of the fork blades 5 between which the trolley wheel 7 is journaled on the axle 8, the latter passing through the center of the trolley wheel and also through the branches 6 of the fork and being secured as hereinafter described. Normally the longer arm of the bell crank lever is about in longitudinal alinement with the arm 2 while the shorter arm 9 of said lever or fork extends substantially at right angles to the arm 2 and has pivotally connected to the extremity thereof by means of a pin or bolt 10, a guard 11 embodying oppositely arranged sheet plates 12, which at their upper edges are extended and flared outward and form guard flanges 13 which lie at opposite sides of the trolley wheel 7 and under certain conditions project above the periphery of said wheel so as to lie at opposite sides of the trolley wire preventing the wheel from jumping off said wire.

The guard 12 comprises an elbow or bell crank lever extension 14 pivotally connected to the arm 9 by the pin or bolt 10 above referred to while the shorter arm 15 thereof has pivotally connected thereto at 16 a fulcrum rod 17 which passes through a bracket lug 18 on the trolley harp and secured relatively to said lug and made adjustable by means of nuts 19 and 20 threaded on said rod at opposite sides of the bracket lug 18. By adjusting the rod 17 and correspondingly changing the position of the fulcrum 16, the degree of projection of the guard beyond the periphery of the trolley wheel may be regulated.

Mounted on the same pin or bolt 10 above referred to is an adjustable tension device comprising a rod or stem 21 having at its upper end a spring seat or shoulder 22 and also provided at a point distant therefrom with a collar 23 movable along the stem. Between the shoulder 22 and the collar 23 there is arranged an adjustable tension spring coiled around the rod or stem 21. The stem or rod 21 passes through an opening in the bracket lug 18 and is held and rendered adjustable as to the degree of its movement by a nut 25 in connection with which a jam nut 26 may be used to fix the adjustment. When the pressure between the trolley wheel and the overhead wire is relieved, the spring 24 is allowed to expand and it thereby moves the guard upward to its working position.

The cheek plates 12 are slotted as shown at 27 to admit of the relative movement between the guard and the trolley wheel.

By reference to Fig. 4 it will be observed that the central tread 28 of the trolley wheel is movable between the trolley wheel flanges 29 toward and away from the axis of rotation of the wheel as a whole, this being accomplished by providing the central portion or section of the wheel with a large central opening and arranging one or more springs 30 within said opening which form a connection between the central tread of the wheel and the hub of the wheel. As a result of this arrangement, when the trolley wheel strikes a lump or projection on the wire, the central portion of tread of the wheel is adapted to yield toward the axle of the wheel thereby temporarily deepening the groove in the periphery of the wheel and reducing the liability of the wheel jumping the wire. Then if the pressure between the wheel and the wire is relieved, the guard moves upward until the flanges 13 thereof lie at opposite sides of the wire thereby rendering the peripheral recess of the device as a whole still deeper and making it a matter of great difficulty for the trolley as a whole to jump the wire.

The axle 8 is provided adjacent to one end and at opposite sides with grooves or notches 31 to receive a slotted key 32. This key is provided with a stem 33 adapted to slide through suitable guides 34 on the trolley wheel carrier or fork, the key being pressed into engagement with the axle 8 by means of a coil spring 35, which surrounds the stem and bears against a shoulder or collar 36 on said stem as shown. The stem or rod is further provided with a thumb piece or head 37 whereby the key may be withdrawn from engagement with the axle by overcoming the tension of the spring 35. This enables the trolley wheel to be easily removed and replaced.

Having thus described the invention, what is claimed as new, is:—

1. In a trolley harp, a trolley wheel, a carrying fork for said wheel, and a wheel guard having a movement relatively to said wheel and adapted to be held out of working position by the pressure between the wheel and overhead wire, a guard elevating rod, and a spring encircling said rod and having an adjustable tension and adapted to slide said rod and move the guard into operative position when said pressure is relieved.

2. In a trolley harp, a trolley wheel, a carrying fork for said wheel, a wheel guard having a movement relatively to said wheel and adapted to be held out of working position by the pressure between the wheel and overhead wire, and means for adjusting the degree of projection of the guard beyond the periphery of the wheel embodying a controlling rod, a guide for said rod, a spring acting to lift the guard, and means for regulating the limit of throw of said rod.

In testimony whereof I affix my signature in presence of two witnesses.

THOMAS A. GANNOE.

Witnesses:
 ALBERT H. SCHMUTZ,
 T. P. REIZ.